US006931233B1

(12) United States Patent
Tso et al.

(10) Patent No.: US 6,931,233 B1
(45) Date of Patent: Aug. 16, 2005

(54) GPS RF FRONT END IC WITH PROGRAMMABLE FREQUENCY SYNTHESIZER FOR USE IN WIRELESS PHONES

(75) Inventors: Robert Tso, South San Gabriel, CA (US); Noshir Behli Dubash, San Pedro, CA (US); Tao Zhang, Fremont, CA (US)

(73) Assignee: Sirf Technology, Inc., San Jose, CA (US)

( * ) Notice: Subject to any disclaimer, the term of this patent is extended or adjusted under 35 U.S.C. 154(b) by 628 days.

(21) Appl. No.: 09/945,143

(22) Filed: Aug. 31, 2001

Related U.S. Application Data

(60) Provisional application No. 60/229,839, filed on Aug. 31, 2000.

(51) Int. Cl.[7] .............................................. H04B 7/185
(52) U.S. Cl. ...................................................... 455/12.1
(58) Field of Search ................................ 455/12.1, 13.2

(56) References Cited

U.S. PATENT DOCUMENTS

| | | |
|---|---|---|
| 3,739,786 A | 6/1973 | Greenspan et al. |
| 4,426,712 A | 1/1984 | Gorski-Popiel |
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |
| 4,998,111 A | 3/1991 | Ma et al. |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,177,490 A | 1/1993 | Ando et al. |
| 5,202,829 A | 4/1993 | Geier |

(Continued)

FOREIGN PATENT DOCUMENTS

| | | |
|---|---|---|
| EP | 511741 | 11/1992 |
| EP | 1 092 987 | 4/2001 |
| GB | 2115195 | 1/1983 |
| JP | 58-105632 | 6/1983 |
| JP | 7-36035 | 5/1986 |
| JP | 4-326079 | 11/1992 |
| JP | 2000-102058 | 4/2000 |
| WO | WO 90/11652 | 10/1990 |
| WO | WO 99/47943 | 9/1999 |
| WO | WO 00/10031 | 2/2000 |

OTHER PUBLICATIONS

New Fast GPS Code–Acquisition using FFT, Electronic Letters, vol. 27, No. 2, pp. 158–160 (1991).
Novel Fast GPS/GLONASS Code Acquisition Technique Using Low Update Rate FFT, Electronic Letters, vol. 28, No. 9, pp. 863–865 (1992).

*Primary Examiner*—Creighton Smith

(57) ABSTRACT

A GPS RF Front End IC containing a Programmable Frequency synthesizer is disclosed. The GPS RF front end IC having a programmable frequency synthesizer allows a relatively fixed internal frequency plan while able to use a number of different reference frequencies provided by the host platform, which can be a wireless phone, or other such device, which can provide an accurate reference frequency signal.

3 Claims, 2 Drawing Sheets

U.S. PATENT DOCUMENTS

| | | | |
|---|---|---|---|
| 5,223,844 A | 6/1993 | Mansell et al. | |
| 5,225,842 A | 7/1993 | Brown et al. | |
| 5,293,170 A | 3/1994 | Lorenz et al. | |
| 5,311,149 A * | 5/1994 | Wagner et al. | 331/1 A |
| 5,311,195 A | 5/1994 | Mathis et al. | |
| 5,323,164 A | 6/1994 | Endo | |
| 5,343,209 A | 8/1994 | Sennott et al. | |
| 5,345,244 A | 9/1994 | Goldea et al. | |
| 5,347,284 A | 9/1994 | Volpi et al. | |
| 5,347,536 A | 9/1994 | Meehan | |
| 5,365,450 A | 11/1994 | Schuchman et al. | |
| 5,379,224 A | 1/1995 | Brown et al. | |
| 5,402,347 A | 3/1995 | McBurney et al. | |
| 5,416,712 A | 5/1995 | Geier et al. | |
| 5,420,596 A | 5/1995 | Niles | |
| 5,422,813 A | 6/1995 | Schuchman et al. | |
| 5,440,313 A | 8/1995 | Osterdock et al. | |
| 5,450,344 A | 9/1995 | Woo et al. | |
| 5,504,684 A | 4/1996 | Lau et al. | |
| 5,506,587 A | 4/1996 | Lans | |
| 5,535,278 A | 7/1996 | Cahn et al. | |
| 5,564,098 A * | 10/1996 | Rodal et al. | 455/314 |
| 5,587,715 A | 12/1996 | Lewis | |
| 5,592,173 A | 1/1997 | Lau et al. | |
| 5,625,668 A | 4/1997 | Loomis et al. | |
| 5,663,734 A | 9/1997 | Krasner | |
| 5,663,735 A | 9/1997 | Eshenbach | |
| 5,666,330 A | 9/1997 | Zampetti | |
| 5,701,328 A | 12/1997 | Schuchman et al. | |
| 5,726,893 A | 3/1998 | Schuchman et al. | |
| 5,737,715 A * | 4/1998 | Deaton et al. | 455/12.1 |
| 5,745,741 A * | 4/1998 | King | 713/500 |
| 5,757,786 A | 5/1998 | Joo | |
| 5,781,156 A | 7/1998 | Krasner | |
| 5,786,789 A | 7/1998 | Janky | |
| 5,812,087 A | 9/1998 | Krasner | |
| 5,825,327 A | 10/1998 | Krasner | |
| 5,828,694 A | 10/1998 | Schipper | |
| 5,831,574 A | 11/1998 | Krasner | |
| 5,841,396 A | 11/1998 | Krasner | |
| 5,845,203 A | 12/1998 | LaDue | |
| 5,854,605 A | 12/1998 | Gildea | |
| 5,874,914 A | 2/1999 | Krasner | |
| 5,877,724 A | 3/1999 | Davis | |
| 5,877,725 A | 3/1999 | Kalafus | |
| 5,883,594 A | 3/1999 | Lau | |
| 5,884,214 A | 3/1999 | Krasner | |
| 5,889,474 A | 3/1999 | LaDue | |
| 5,903,654 A | 5/1999 | Milton et al. | |
| 5,907,809 A | 5/1999 | Molnar et al. | |
| 5,917,444 A | 6/1999 | Loomis et al. | |
| 5,920,283 A | 7/1999 | Shaheen et al. | |
| 5,923,703 A | 7/1999 | Pon et al. | |
| 5,926,131 A | 7/1999 | Sakumoto et al. | |
| 5,936,572 A | 8/1999 | Loomis et al. | |
| 5,940,027 A | 8/1999 | Forseth et al. | |
| 5,943,363 A | 8/1999 | Hanson et al. | |
| 5,945,944 A | 8/1999 | Krasner | |
| 5,963,582 A | 10/1999 | Stansell, Jr. | |
| 5,977,909 A | 11/1999 | Harrison et al. | |
| 5,982,324 A | 11/1999 | Watters et al. | |
| 5,987,016 A | 11/1999 | He | |
| 5,999,124 A | 12/1999 | Sheynblat | |
| 6,002,362 A | 12/1999 | Gudat | |
| 6,002,363 A | 12/1999 | Krasner | |
| 6,009,551 A | 12/1999 | Sheynblat | |
| 6,016,119 A | 1/2000 | Krasner | |
| 6,041,222 A | 3/2000 | Horton et al. | |
| 6,047,017 A | 4/2000 | Cahn et al. | |
| 6,052,081 A | 4/2000 | Krasner | |
| 6,061,018 A | 5/2000 | Sheynblat | |
| 6,064,336 A | 5/2000 | Krasner | |
| 6,081,229 A | 6/2000 | Soliman et al. | |
| 6,104,338 A | 8/2000 | Krasner | |
| 6,104,340 A | 8/2000 | Krasner | |
| 6,104,712 A | 8/2000 | Robert et al. | |
| 6,107,960 A | 8/2000 | Krasner | |
| 6,111,540 A | 8/2000 | Krasner | |
| 6,111,541 A | 8/2000 | Karmel | |
| 6,122,506 A | 9/2000 | Lau et al. | |
| 6,131,067 A | 10/2000 | Ginerd et al. | |
| 6,133,871 A | 10/2000 | Krasner | |
| 6,133,873 A | 10/2000 | Krasner | |
| 6,133,874 A | 10/2000 | Krasner | |
| 6,150,980 A | 11/2000 | Krasner | |
| 6,172,640 B1 | 1/2001 | Durst et al. | |
| 6,178,195 B1 | 1/2001 | Durboraw, III et al. | |
| 6,185,427 B1 | 2/2001 | Krasner et al. | |
| 6,188,351 B1 | 2/2001 | Bloebaum | |
| 6,211,819 B1 | 4/2001 | King et al. | |
| 6,222,484 B1 | 4/2001 | Seiple et al. | |
| 6,225,944 B1 | 5/2001 | Hayes | |
| 6,236,365 B1 | 5/2001 | LeBlanc et al. | |
| 6,249,245 B1 | 6/2001 | Watters et al. | |
| 6,263,280 B1 | 7/2001 | Stingone, Jr. | |
| 6,347,228 B1 | 2/2002 | Ludden et al. | |
| 6,353,412 B1 | 3/2002 | Soliman | |
| 6,389,291 B1 | 5/2002 | Pande et al. | |
| 6,400,314 B1 | 6/2002 | Krasner | |
| 6,405,132 B1 | 6/2002 | Breed et al. | |
| 6,411,811 B2 | 6/2002 | Kingdon et al. | |
| 6,427,120 B1 | 7/2002 | Garin et al. | |
| 6,429,815 B1 | 8/2002 | Soliman | |
| 6,433,739 B1 | 8/2002 | Soliman | |
| 6,456,234 B1 | 9/2002 | Johnson | |
| 6,473,030 B1 | 10/2002 | McBurney et al. | |
| 6,480,145 B1 | 11/2002 | Hasegawa | |
| 6,505,161 B1 | 1/2003 | Brems | |
| 6,519,466 B2 | 2/2003 | Pande et al. | |
| 6,526,352 B1 | 2/2003 | Breed et al. | |
| 6,542,823 B2 | 4/2003 | Garin et al. | |
| 6,583,734 B2 | 6/2003 | Bates et al. | |
| 6,633,255 B2 | 10/2003 | Krasner | |
| 6,677,894 B2 | 1/2004 | Sheynblat et al. | |
| 6,684,158 B1 | 1/2004 | Garin et al. | |
| 6,720,920 B2 | 4/2004 | Breed et al. | |
| 6,731,238 B2 | 5/2004 | Johnson | |
| 6,738,630 B2 | 5/2004 | Ashmore | |

\* cited by examiner

GPS RF FRONT END IC WITH PROGRAMMABLE FREQUENCY SYNTHESIZER FOR USE IN WIRELESS PHONES

CROSS-REFERENCE TO RELATED APPLICATIONS

This application claims priority under 35 U.S.C. § 119(e) of U.S. Provisional Patent Application No. 60/229,839, filed Aug. 31, 2000, entitled "GPS RF FRONT END IC WITH PROGRAMMABLE FREQUENCY SYNTHESIZER FOR USE IN WIRELESS PHONES," by Robert Tso et al., which application is incorporated by reference herein.

BACKGROUND OF THE INVENTION

1. Field of the Invention

The present invention relates in general to Global Positioning System (GPS) receivers, and in particular to a GPS Radio Frequency (RF) front end integrated circuit (IC) with a programmable frequency synthesizer.

2. Description of the Related Art

U.S. Pat. No. 6,041,222, which is herein incorporated by reference, describes a method of using a common reference signal for both GPS and wireless subsystems, but does not present a method which is compatible with the frequency requirements of U.S. Pat. No. 5,897,605, which is herein incorporated by reference.

SUMMARY OF THE INVENTION

To minimize the limitations in the prior art, and to minimize other limitations that will become apparent upon reading and understanding the present specification, the present invention discloses a GPS RF Front End IC, containing a Programmable Frequency synthesizer which allows for a relatively fixed internal frequency plan while able to use a number of different reference frequencies provided by the host platform, which can be a wireless telephone device, or other such device, which can provide an accurate reference frequency signal.

An object of the present invention is to provide a GPS RF front end that can accept different reference frequencies allowing a common frequency reference to be used by the GPS receiver and the host device, such as a wireless transceiver.

BRIEF DESCRIPTION OF THE DRAWINGS

Referring now to the drawings in which like reference numbers represent corresponding parts throughout.

DETAILED DESCRIPTION OF THE INVENTION

Figure 1:
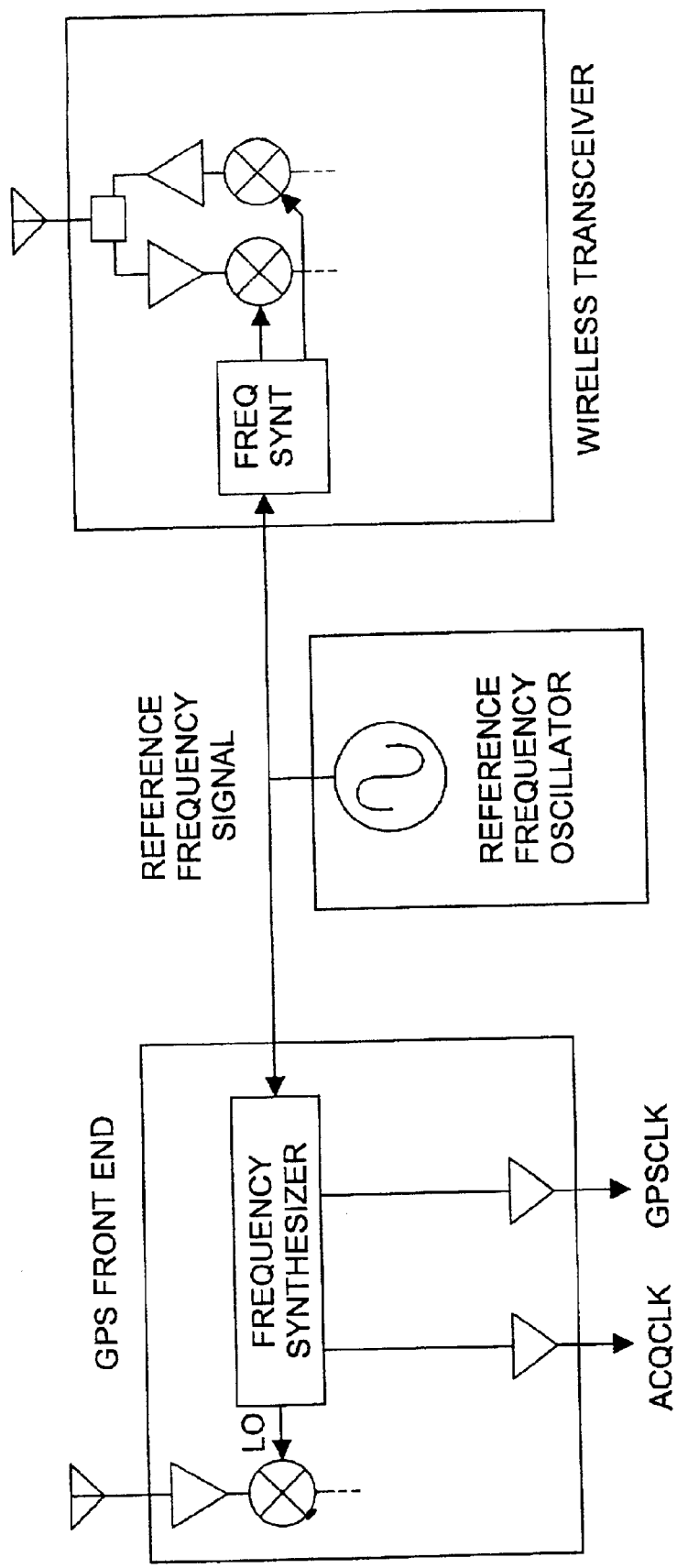
FIG. 1 illustrates a wireless mobile terminal wherein a common Reference Frequency Oscillator used to provide a common Reference Frequency Signal to both a GPS Front End Frequency synthesizer, and to a Wireless Transceiver Frequency Synthesizer.

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

This invention when combined with the receiver described in U.S. Pat. No. 5,897,605 comprise a GPS Receiver chip set which forms the core of a complete GPS receiver.

The spread spectrum receiver of U.S. Pat. No. 5,897,605 processes GPS sampled data at 48 fo. The invention described herein provides clocks and sampled data at rates compatible with the requirements of this receiver for a wide variety of commonly used reference frequencies, such as those available in host products like cellular telephones, two way pagers, etc. This is important since it allows the same GPS chip set to be used in a number of different wireless handsets with different standards and reference frequencies without redesigning the frequency inputs to the chipset, as well as eliminating the requirement for multiple crystals within the GPS receiver.

The LO frequency ($F_{LO}$) is generated by the Programmable Frequency Synthesizer of the present invention, which can be implemented in at least two ways described below: 1) M/N 2) Fractional-N.

Method 1: M/N

Table 1 below provides the values of M and N that will generate an LO which places the IF center at approximately $9\frac{1}{3}$ fo. The Synthesizer uses programmable counters M and N. The frequency plan assumes that LO is approximately $F_{LO}=(1540-9\ \frac{1}{3})\times fo$, where fo=1.023 MHz.

TABLE 1

M/N Frequency Synthesizer design parameters for Commonly used Wireless reference frequencies.

| Reference Frequency | M (Feedback divider) | N (Ref divider) |
|---|---|---|
| 13.0 MHz | 4336(= 16 × 271) | 36 |
| 26 MHz | 4336 | 72 |
| 15.36 MHz | 3568(= 16 × 223) | 35 |
| 16.8 MHz | 3728(= 16 × 233) | 40 |
| 19.2 MHz | 2528(= 16 × 158) | 31 |
| 19.68 MHz | 2816(= 16 × 179) | 36 |
| 12.00 MHz | 4176(= 16 × 261) | 32 |

Method 2: Fractional-N

The Fractional-N synthesizer uses a DIV-4 prescaler, with output as the input clock of the M divider. The M divider includes a pulse swallow function, which effectively results in dividing by M+1 in the event that a clock pulse is swallowed. The rate at which M+1 mode is active is controlled by the overflow bit of an 8-bit accumulator, which has a programmable addend. For example, in the case of 13 MHz reference, a divide-2 prescaler is used to create a reference at 6.5 MHz. This needs to be multiplied up by 60.2258. Since an 8-bit accumulator is used, this is approximated by using an addend of 58, which results in an apparent dopplet of 19 kHz. It is advantageous in order to simplify GPS software to have a frequency plan where the frequency error or "doppler" is always of one polarity, has limited magnitude (<200 kHz) and is not close to zero with some reasonable margin (10 kHz). Table 2 provides the Fractional N frequency plan for use with commonly used wireless reference frequencies.

TABLE 2

Fractional N Frequency Plan for commonly used Wireless reference frequencies.

| Ref Freq | Div N | Fref | M(float) | Frac | 8-bit add | M-implement | Flo | Fdoppler(kHz) |
|---|---|---|---|---|---|---|---|---|
| 13 | 2 | 6.5 | 60.2258 | 0.2258 | 58 | 60.2266 | 1,565.89 | 19 |
| 26 | 4 | 6.5 | 60.2258 | 0.2258 | 58 | 60.2266 | 1,565.89 | 19 |
| 15.36 | 3 | 5.12 | 76.4586 | 0.4586 | 118 | 76.4609 | 1,565.92 | 48 |
| 16.8 | 3 | 5.6 | 69.9050 | 0.9050 | 232 | 69.9063 | 1,565.90 | 28 |
| 19.2 | 3 | 6.4 | 61.1669 | 0.1669 | 43 | 61.1680 | 1,565.90 | 28 |
| 19.68 | 3 | 6.56 | 59.6750 | 0.6750 | 173 | 59.6758 | 1,565.89 | 20 |

DETAILED DESCRIPTION

FIG. 1 illustrates a wireless mobile terminal wherein a common Reference Frequency Oscillator used to provide a common Reference Frequency Signal to both a GPS Front End Frequency synthesizer, and to a Wireless Transceiver Frequency Synthesizer. The Frequency Synthesizer within the GPS Front End generates an LO signal which is used to down convert the GPS bearing signals to a lower frequency IF signal. The GPS Frequency Synthesizer also generates clocking signals ACQCLK and GPSCLK for usage by the digital section of the GPS Receiver.

Figure 2:
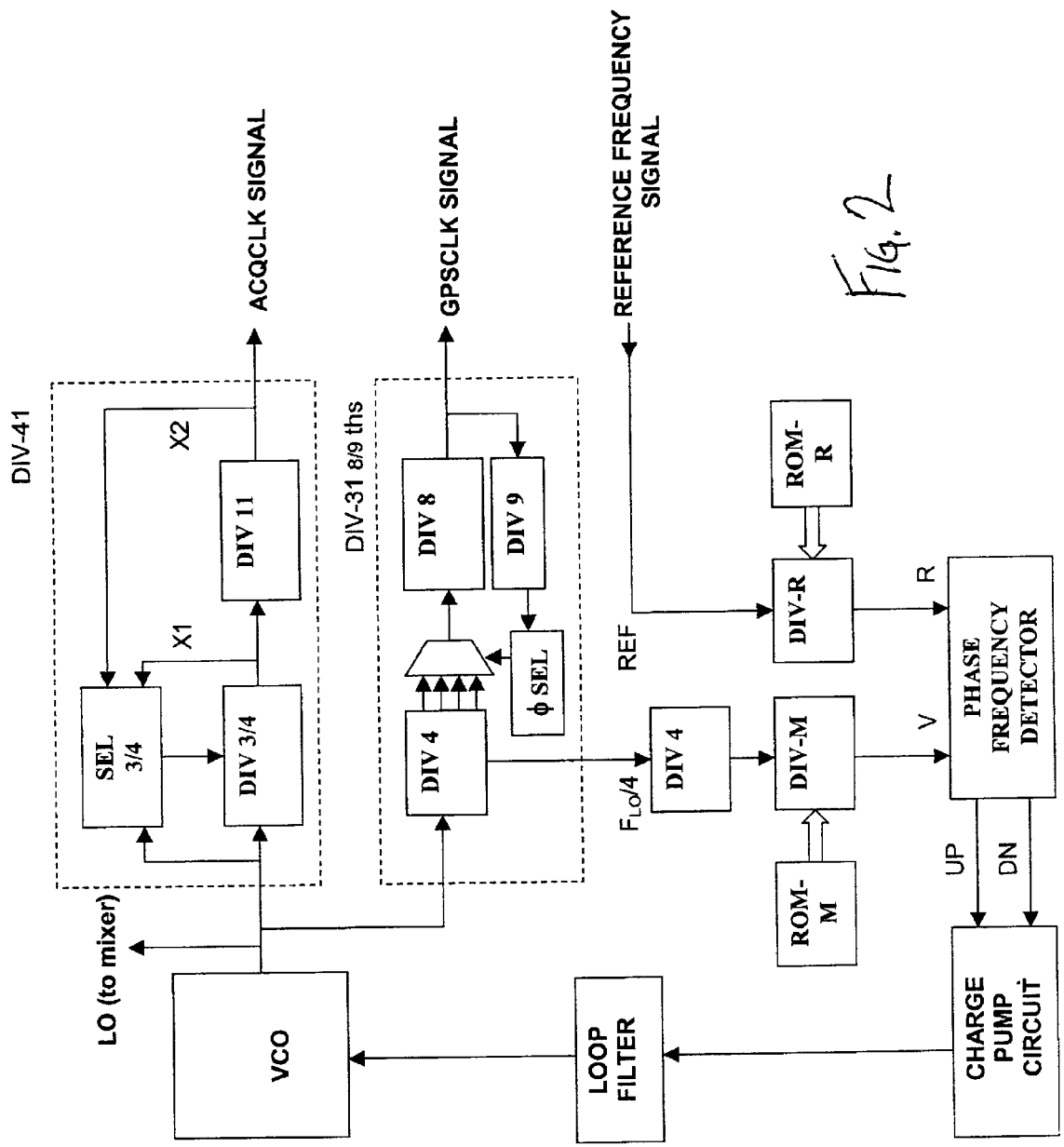
FIG. 2 illustrates an implementation of the GPS Frequency Synthesizer in accordance with the present invention.

FIG. 2 illustrates one implementation of the GPS Frequency Synthesizer. A VCO is controlled by a Phase Lock Loop (PLL) to produce and maintain an LO signal with frequency near 1566 MHz. This LO signal is used by the down-converting mixer(s) of the GPS Front End. It is also provided to a DIV-41 counter used to generate the ACQCLK signal, and to a DIV 31-⅝$^{th}$ counter to generate the GPSCLK signal. The DIV 31-⅝$^{th}$ counter also provides a LO/4 output signal which is used by the PLL to phase lock the VCO output signal (LO) to the Reference Frequency Signal (REF).

ACQCLK Synthesis

The DIV-41 counter used to synthesize ACQCLK is a dual-modulus type counter, which is well known to practitioners in the art of electronic Frequency Synthesis. The DIV-41 is comprised of a DIV-3/4 prescaler inputting the LO signal and outputting a reduced frequency signal X1, which is coupled to the input of a DIV-11 counter, which in turn produces the ACQCLK signal at its output A Select 3-or-4 function controls the state of DIV-3/4 so it divides by 3 or divides by 4 as required to obtain an overall divide ratio of 41. The SEL block is implemented by delay gates and flip-flops for re-timing, which has inputs LO, X1 and X2. The divide factor of 41 is obtained by dividing by 4 for 8 states, followed by dividing by 3 for 3 states of the DIV-11 counter. So, counting LO cycles, we have (4×8)+(3×3)=(32)+(9)=41 LO cycles before the output of the DIV-11 repeats, which is the desired behavior to obtain the proper divide ratio. Other dual-modulus schemes are possible to implement a DIV-41 function, such as DIV-5/6 driving a DIV8, where divide by 5 is active for 7 states, followed by divide by 6 for the 1 remaining state of DIV8. In this case, we would have (5×7)+(6×1)=(35)+(6)=41. Another possible implementation uses a DIV4, providing 4 output phases into a 4:1 mux. The mux output drives the input of a DIV-10 counter. A phase select counter retards the phase by 90 degrees, every time the DIV-10 counter completes a cycle, and produces a rising or falling edge. The advantage of this 3$^{rd}$ implementation is that it shares a common DIV-4 element with that used for the GPSCLK Synthesis, which lowers power dissipation and die area.

GPSCLK Synthesis

The GPSCLK is synthesized by using a simple fractional-N method. The effective divide ratio here is a value between 31 and 32. More specifically this invention achieves an effective time averaged divider ratio of 31 and ⅝ths. The manner by which this is achieved is as follows. The LO signal is first divided down by a DIV-4 prescaler, configured to have 4 outputs, each output having a 90 degree phase relationship with one of the other outputs. One can think of the 4 outputs as having 0, 90, 180, and 270 degrees of phase shift. A 4-to-1 mux is used to periodically advance the phase of the input signal to the DIV-8 counter. When it occurs, the phase advancement causes the subsequent DIV-8 counter to advance its state changes by exactly one LO period. The output of the DIV-8 counter drives the input of a DIV-9 counter, which in turn drives a DIV-4 state counter, which in turn is used to produce a mux SEL signal for the 4:1 mux. The operation is as follows: The counter spends most of its time in DIV-32 mode. The mux SEL signal is constant for 8 of the 9 phase states of the DIV-9 counter. When the DIV-9 counter outputs a rising edge, a DIV-4 state counter is toggled, which causes the 4:1 mux to advance the phase of the 4:1 mux output, which is coupled to the DIV-8 input Since this causes the DIV-8 output to toggle one LO period sooner, effectively the divide value becomes 31 instead of 32. Thus, we have a divider pattern of divide by 32, 8 times, followed by divide by 31 once, and then repeating. The time averaged divide ratio would thus be calculated as: [(32×8)+(31×1)]/9=[256+31]/9=287/9=31⅝ths. In other words, the GPSCLK output signal waveform would contain 8 cycles that are slightly "too long" (generated by divide by 32) followed by a cycle that is "too short" (generated by divide by 31) so that over the average of 9 cycles, the frequency of GPSCLK is exactly as required. For the GPS frequency plan where the frequency of GPSCLK is about 49.107 MHz, the time domain "error" in the long and short cycles is about 71 psec and −568 psec respectively.

Programmability to Accept Various Reference Frequency Signals:

The remaining portion of the Frequency Synthesizer not discussed above serves to allow the VCO to be phase locked to a number of Reference Frequency (REF) signals having different frequencies. This is achieved by using a technique well known to practitioners in the art of electronic frequency synthesis as "M-over-N" synthesis. The REF signal is inputted to a programmable modulus divider DIV-N which provides the "R" input of the Phase Frequency Detector (PFD). The LO/4 signal is inputted to a DIV-4 counter, the output of which is the input of a programmable modulus DIV-M counter. The output of the DIV-M counter is the "V" input of the PFD. The outputs of the PFD are coupled to the inputs of a Charge Pump (CP) circuit The output of the CP circuit is coupled to a Loop Filter, which is also coupled to the control input of the VCO, thus providing the feedback signal needed to "close the loop" of the PLL.

The DIV-N counter is implemented as a 7-bit count-down counter, so that divide ratios from 128 to 2 can be programmed for DIV-N. The DIV-M counter is implemented as a 9-bit count-down counter, so that divide ratios from 512 to 2 can be programmed for DIV-M. Other implementations are possible by simply extending the size of the counters, however the implementation disclosed is adequate for the range of REF frequencies in Table 1, given the frequency offset constraints of the GPS receiver disclosed in U.S. No. 5,897,605.

GPS receivers are typically limited to operate using a fixed frequency plan. The selection of "N" and "M" divide values is done with the criteria of choosing the lowest values of "N" and "M" that produces an LO frequency that results in a substantially small frequency offset which can be accommodated by the GPS receiver. Small values of "N" and "M" are desired to maximize the PLL reference frequency and to maximize the available loop gain of the PLL

CONCLUSION

In summary, a GPS RF front end with programmable synthesizer is disclosed. A GPS RF Front End in accordance with the present invention comprises a Voltage Controlled Oscillator (VCO) for producing a Local Oscillator (LO) signal, wherein the LO signal has a frequency at approximately 1566 MHz, a first fixed counter means, coupled to the VCO, for dividing the LO signal frequency by 41, to obtain a second signal with frequency of LO/41, wherein the second signal is an ACQCLK signal, a second fixed counter means, coupled to the VCO, for dividing the LO signal by 31-and-⅜ths, to obtain a third signal with frequency of 9/7 times the frequency of the second signal, wherein the second signal is a GPSCLK signal, the second fixed counter means further comprising a first divide-by-4 counter, the first divide-by-4 counter having five outputs, each output having a frequency of LO/4, a second divide-by-4 counter, coupled to one of the five outputs of the first divide-by-4 counter, a first programmable countdown counter, coupled to the output of the second divide-by-4 counter, a second programmable count-down counter, coupled to a Reference Frequency Signal, the Reference Frequency Signal being used by the wireless mobile terminal, and a Phase Frequency Detector, coupled to the outputs of the first and second programmable count-down counters, for comparing the phase and frequency of the outputs of the first and second programmable count-down counters.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. A GPS RF Front End integrated within a wireless mobile terminal, the GPS RF Front End containing a Frequency Synthesizer comprising:

a Voltage Controlled Oscillator (VCO) for producing a Local Oscillator (LO) signal, wherein the LO signal has a frequency at approximately 1566 MHz;

a first fixed counter means, coupled to the VCO, for dividing the LO signal frequency by 41, to obtain a second signal with frequency of LO/41, wherein the second signal is an ACQCLK signal;

a second fixed counter means, coupled to the VCO, for dividing the LO signal by 31-and-⅜ths, to obtain a third signal with frequency of 9/7 times the frequency of the second signal, wherein the second signal is a GPSCLK signal, the second fixed counter means further comprising a first divide-by-4 counter, the first divide-by-4 counter having five outputs, each output having a frequency of LO/4;

a second divide-by-4 counter, coupled to one of the five outputs of the first divide-by-4 counter;

a first programmable count-down counter, coupled to the output of the second divide-by-4 counter;

a second programmable count-down counter, coupled to a Reference Frequency Signal, the Reference Frequency Signal being used by the wireless mobile terminal; and a Phase Frequency Detector, coupled to the outputs of the first and second programmable count-down counters, for comparing the phase and frequency of the outputs of the first and second programmable count-down counters.

2. The GPS RF Front End of claim 1, wherein the first counter means comprises:

a divide-by-3/4 counter; and a divide-by-11 counter, coupled to the output of the divide-by-3/4 counter, wherein the LO signal, the output of the divide-by-3/4, and the output of the divide-by-11 counter assist in the generation of a select control signal to determine the divide ratio of the divide-by-3/4 counter.

3. The GPS RF Front End of claim 1, wherein the first counter means comprises:

a divide-by-4 counter for producing four quadrature signals each having frequency LO/4, a 4:1 mux, coupled to the divide-by-4 counter;

a divide-by-10 counter coupled to a output of 4:1 mux output; and a state register for controlling a phase selection state of the 4:1 mux.

* * * * *